Dec. 30, 1924.
W. HOEY
AUTOMOBILE SIGNAL
Filed April 7, 1924
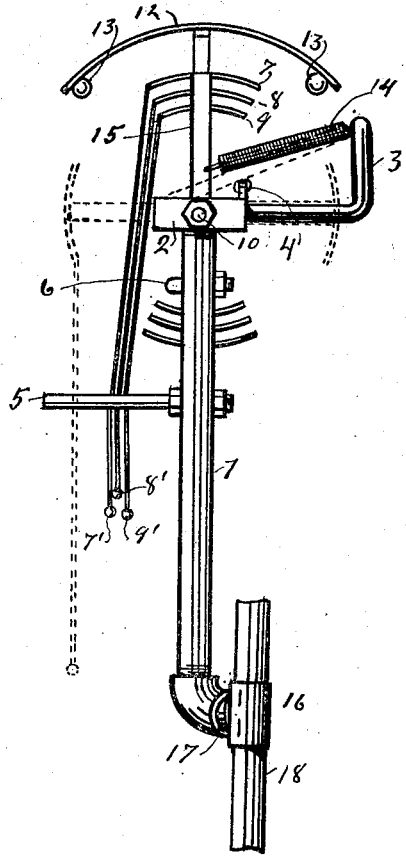
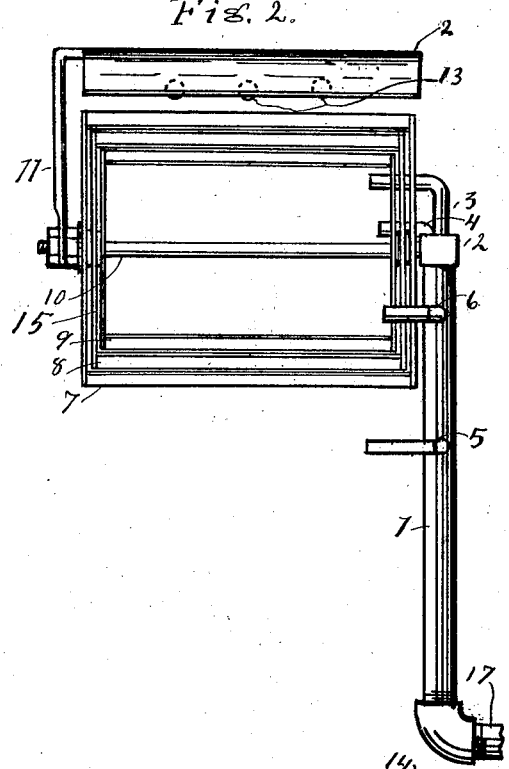
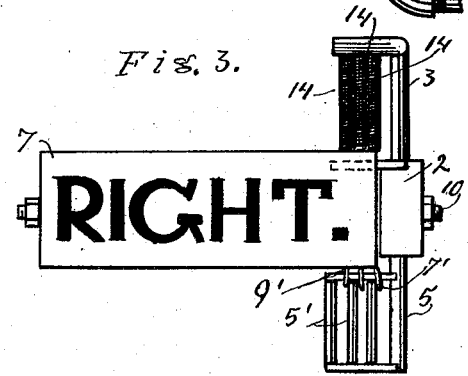
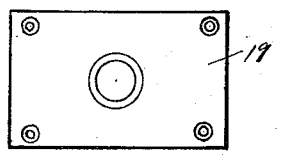
INVENTOR.
William Hoey
BY Ithiel J. Cilley
ATTORNEY.

Patented Dec. 30, 1924.

1,520,867

UNITED STATES PATENT OFFICE.

WILLIAM HOEY, OF GRAND RAPIDS, MICHIGAN.

AUTOMOBILE SIGNAL.

Application filed April 7, 1924. Serial No. 704,668.

*To all whom it may concern:*

Be it known that I, WILLIAM HOEY, a citizen of the United States, residing at Grand Rapids, in the county of Kent and State of Michigan, have invented certain new and useful Improvements in Automobile Signals, of which the following is a specification.

My invention relates to improvements in direction indicators for automobiles, and other driven vehicles, and its objects are: First, to provide an indicator that will be light, ornamental and easy of operation; second, to provide an indicator with which the direction symbols may be readily exhibited both ahead of and back of the automobile; third, to provide a direction indicator for automobiles that will invariably return into normal position after each operation and release; fourth, to provide a direction indicator that will invariably stop in desired positions when being operated, and, fifth, to provide a means whereby the indicator may be illuminated when desired.

I attain these objects by the mechanism disclosed, and the construction of parts shown in the accompanying drawings in which Fig. 1 is an edge elevation of my indicator showing the relative positions of its several parts. Fig. 2 is a side elevation of the same. Fig. 3 is a top plan of the same with the light shield removed to show the imprint upon the outer indicator, and Fig. 4 is a plate for securing the indicator to an enclosed automobile.

Similar numerals indicate similar parts throughout the several views.

In the drawings 1 represents the supporting post of my indicator, which is designed to be secured to the wind shield post 18, or to any other available and desirable place upon the automobile, preferably upon the left hand side of the machine, and in position where it may be readily seen from both ahead of, and behind the automobile. In Figs. 1 and 2 17 represents one form of arm by means of which the indicator may be connected with, and supported by the wind shield standard 18, or other supporting part of the automobile.

My signal proper consists of signal plates 7, 8 and 9 mounted upon arms 15, which latter are pivotally, or revolubly mounted upon the stationary shaft 10 so the signal plates may be drawn into the position indicated by their dotted lines in Fig. 1, when the desired signal, as "Right, Left, or Stop" will be thrown into position to be seen both from ahead of and behind the machine. In the marking of the signal plates the word "Right" is printed, plainly upon the outer surface of the two outer plates, designated at 7; the word "Left" is printed upon the second or center plates 8, and the word "Stop" is printed upon the two inner plates, 9, and these plates are swung around into view by means of the respective cords or chains 7', 8' and 9'. The arms 15 and their respective plates are drawn back into normal positions by means of the springs 14 connected at one end with said arms and at the other ends with the bar 3, mounted in the cross head 2. At 4 I have shown a stopping rod to prevent the signal plates and arms from being drawn too far with the chains 7', 8' and 9', and 6 represents a stopping rod for holding the arms 15 in normal, vertical positions. At 5 I have shown an arm that carries the guiding rollers 5' for the free passage and operation of the chains 7', 8' and 9'.

At 12 I have shown a canopy that is mounted upon the post 11 and acts the double purpose, first, of a shield for the signal plates, and, second, as a support for the light bulbs 13, which latter are designed to illuminate the signal plates after dark. I have placed this shield support upon the outer, or overhanging end of the shaft 10 so it may be readily removed or replaced, if desired, without interference with the signal arms or plates.

It will be readily understood that this indicator may be supported upon any desired part of the automobile by providing the proper securing element or clamp in lieu of the one shown at 16, as, for instance, the plate 19 for securing the arm 17 to the frame of an enclosed automobile by the use of bolts passed through the bolt holes shown at the corners of the plate.

Having thus fully described my invention, what I claim as new in the art, is:

1. In a direction indicator for automobiles, a supporting standard, a shaft extending at right angles from one side of the standard, a pair of arms revolubly mounted at their longitudinal centers upon said shaft, a plate mounted at each end of each pair of said arms, means for revolving said arms into horizontal positions, and means for returning said arms, automatically into normal positions.

2. In a direction indicator for automobiles, a supporting standard, a shaft extending at right angles from one side of said standard, arms pivotally mounted upon said shaft, in pairs, at their longitudinal centers, signal plates mounted upon the ends of each pair of said arms at right angles therewith laterally of said plates, direction symbols printed upon the outer surfaces of said plates, cords attached to the edges of said plates at one end of the arms for drawing said plates into exposed position, springs for drawing said arms and plates back into normal positions after the desired exposition of the signals, guides for controlling the positions of the actuating cords, and stops for holding the arms in normal position and in position to expose the signals.

3. In combination with the elements covered in claim 1, a canopy mounted upon the projecting shaft in position to cover the upper sides of the upper plates in the signals when in normal position.

4. In combination with the elements covered in claim 1, a canopy mounted over the upper plate signals, and electric light bulbs mounted thereon in positions to illuminate the signal plates when in exposed positions.

Signed at Grand Rapids, Michigan, April 3, 1924.

WILLIAM HOEY.